Oct. 8, 1957  J. C. FILIPPI  2,808,638
METAL CUTTING TOOL
Filed Dec. 7, 1954  3 Sheets-Sheet 1
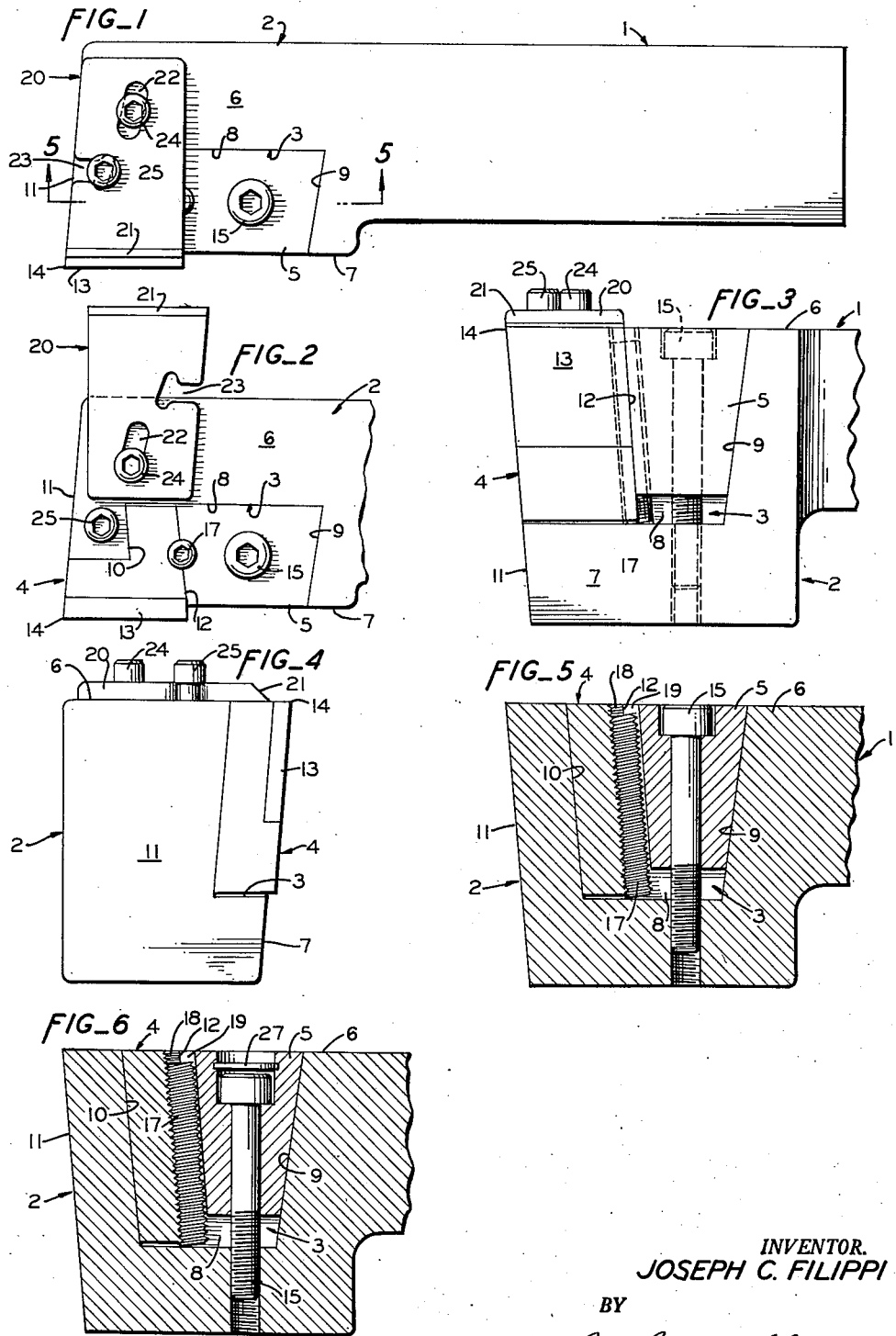
INVENTOR.
JOSEPH C. FILIPPI
BY
Boyken, Mohler & Wood
ATTORNEYS

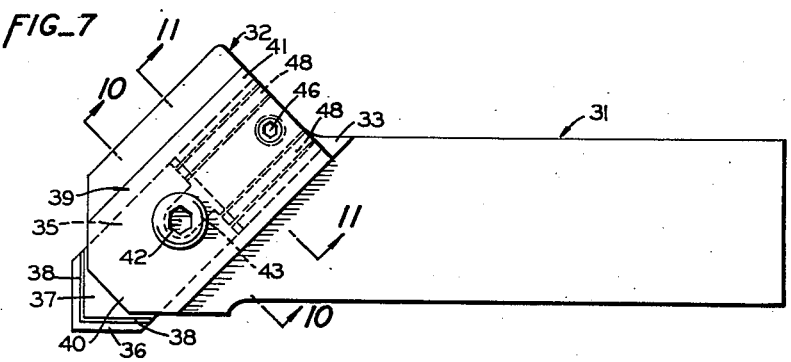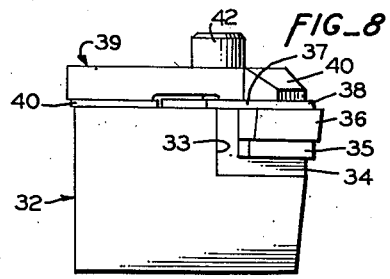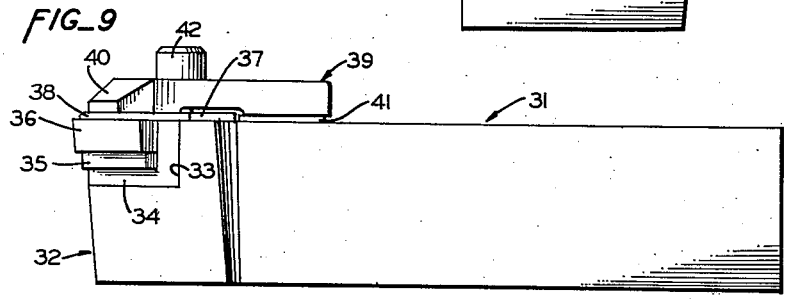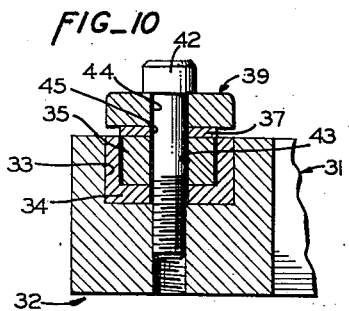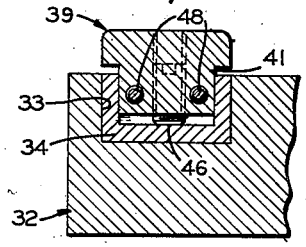

Oct. 8, 1957  J. C. FILIPPI  2,808,638
METAL CUTTING TOOL
Filed Dec. 7, 1954  3 Sheets-Sheet 3
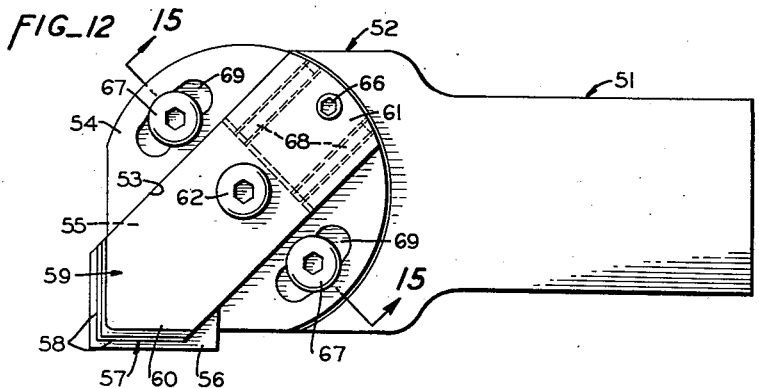
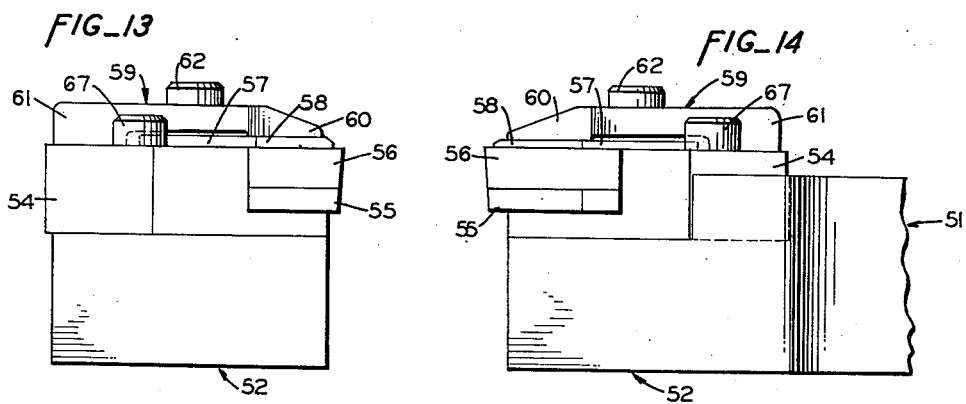
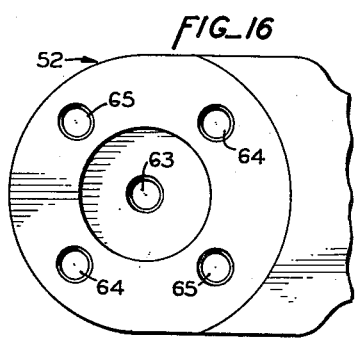
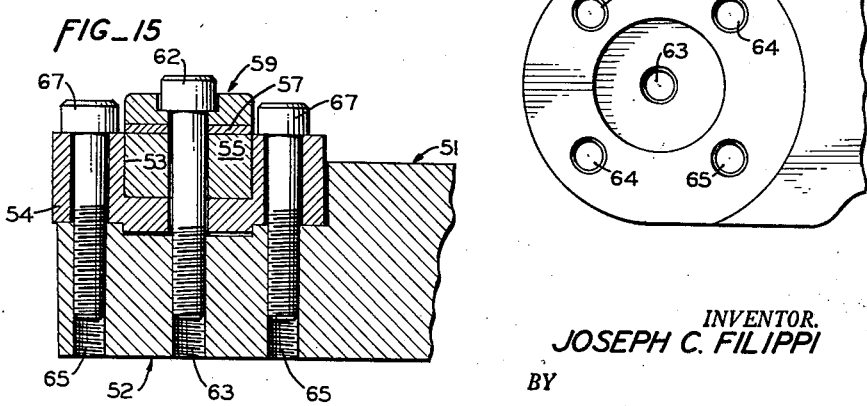
INVENTOR.
JOSEPH C. FILIPPI
BY
*Boyken, Mohler & Wood*
ATTORNEYS

United States Patent Office 2,808,638
Patented Oct. 8, 1957

2,808,638

METAL CUTTING TOOL

Joseph C. Filippi, Mill Valley, Calif., assignor of one-third to Albert O. Bemiss, Burlingame, Calif.

Application December 7, 1954, Serial No. 473,645

1 Claim. (Cl. 29—96)

This invention relates to metal cutting tools and more particularly to improvements in tools having insert bits.

It is well known in the art to provide metal cutting tools, such as are used on lathes and the like, with insert bits. Heretofore such tools have made provision for adjusting the bit with relation to its holder or shank as the bit was sharpened by grinding from time to time.

Large forces are usually exerted on a cutting bit during the cutting operation and it has therefore been found difficult to satisfactorily support the bit in the tool shank. Previous attempts to adequately lock the bit in the shank have either failed or resulted in a complicated locking means.

Furthermore, most of the prior devices in this field were complicated to the extent that insertion and adjustment of the bit after sharpening was difficult and time consuming. In most previous cases a major portion of the bit, constructed usually of an expensive tool steel, was wasted due to the inability of known devices to adjust through a range adequate to make use of the whole bit.

It is therefore a primary object of this invention to provide a tool which permits substantially complete utilization of an insert cutting bit.

Another object of this invention is the provision of a metal cutting tool having an insert bit which may be easily and rapidly adjusted and/or replaced to compensate for wear.

Still another object of this invention is the provision of a cutting tool in which an insert bit may be accurately adjusted and positively locked against disturbance from such adjusted position.

It is a further object of this invention to provide a metal cutting tool having an insert bit which may be easily sharpened.

Yet another object of this invention is the provision of a tool having an insert bit in which said bit may be replaced, adjusted, and locked in place without removing said tool from the machine in which it is being used.

Other objects and advantages will become apparent from the following description taken in connection with the accompanying drawings in which:

Fig. 1 is a top plan view of the preferred form of the tool of this invention;

Fig. 2 is a partial view similar to Fig. 1 with the chip breaker swung out of operative position to show details of the tool;

Fig. 3 is a partial side elevational view of the tool of Fig. 1;

Fig. 4 is an end elevational view of the tool of Fig. 1;

Fig. 5 is a cross sectional view taken along line 5—5 of Fig. 1;

Fig. 6 is a cross sectional view similar to Fig. 5 but showing a modified form of the locking means thereof;

Fig. 7 is a top plan view of a modified form of tool;

Fig. 8 is an end elevation view of the tool of Fig. 7;

Fig. 9 is a side elevational view of the tool of Fig. 7;

Fig. 10 is a cross sectional view taken along line 10—10 of Fig. 7;

Fig. 11 is a cross sectional view taken along line 11—11 of Fig. 7;

Fig. 12 is a top plan view of another modified form of tool;

Fig. 13 is an end elevational view of the tool of Fig. 12;

Fig. 14 is a partial side elevational view of the tool of Fig. 12;

Fig. 15 is a cross sectional view taken along line 15—15 of Fig. 12; and,

Fig. 16 is a partial top plan view of the shank of the tool of Fig. 12 with the cutting bit and carrier removed.

In detail, referring to Figs. 1 through 5, this invention comprises a tool holder or shank 1 having an enlarged head portion 2. Said head portion is provided with a recess 3 opening outwardly of the top 6 and one side 7 thereof. Said recess is formed with a back wall 8, generally parallel to side 7 of head portion 2 and with a pair of side walls 9, 10, converging inwardly from top 6 and diverging inwardly from side 7 of said head portion. Recess 3 therefore provides a dove tail socket having slanting sides for a purpose to be described.

Head portion 2 is also cut away along the front end 11 thereof and into recess 3 so as to receive an elongated, generally L shaped bit carrier 4. Carrier 4 is formed complementary to side wall 10 and back wall 8 of recess 3 so as to fit snugly thereagainst and has an inner surface 12 generally parallel to side wall 10 and spaced from side wall 9 of recess 3. Bit carrier 4 has cutting bit 13, of tool steel or the like, formed integrally therewith and projecting outwardly of head portion 2 of shank 1. From Figs. 2, 3, and 4 it is seen that sufficient clearance angles are provided so that the outermost corner 14 of bit 13 projects for engaging the work to be cut thereby.

Received in the remaining portion of recess 3 between side wall 9 and surface 12 is a locking wedge 5. Said wedge is constructed complementary to the space in which it is received and a locking screw 15 is inserted therethrough and threaded into head 2 at the bottom of recess 3. It is apparent that tightening screw 15 pulls wedge 5 downwardly and locks bit carrier 4 tightly in recess 3 of head 2. The dove tailing of carrier 4 and locking wedge 5 into recess 3 assures the retention of said carrier and said wedge in said recess.

In use the top of bit carrier 4 with integral cutting bit 13 is adapted to be positioned coplanar with the top of shank 1 and head portion 2. As cutting bit 13 becomes worn due to usage it is necessary to remove said bit for sharpening. Unthreading screw 15 releases wedge 5 which may be pried upwardly to allow removal of bit carrier 4 from recess 3. The carrier with its integral bit may then be sharpened by grinding the top end thereof to provide a sharp corner at 14 and sharp edges leading therefrom. Bit carrier 4 is then reinserted in recess 3 as previously explained.

In order to adjust the top end of bit carrier 4 coplanar with the top 6 of head portion 2 adjusting screw 17 is provided. One side of adjusting screw 17 is threadedly received in threaded half hole 18 (Fig. 5) formed in surface 12 of bit carrier 4. The other side of screw 17 is received in a smooth bore half hole 19 formed in the adjacent surface of locking wedge 5. The lower end of said adjusting screw bears on the bottom of recess 3 so that turning of said screw in one direction causes bit carrier 4 to rise. In this manner, when locking wedge 5 is slightly loose, the top end of bit carrier 4 with integral bit 13 may be adjusted coplanar with top 6 of head portion 2.

When said adjustment has been made after sharpening said bit the carrier may again be locked in its adjusted position by tightening locking screw 15 thereby forcing wedge 5 downwardly.

It is noted that cutting bit 13 extends only partially along the outer surfaces of carrier 4. When the bit and carrier have been reground numerous times to compenste for wear to the full extent of cutting bit 13, the remainder of carrier 4 is discarded and a new carrier and bit reinserted and used as previously described. In this connection, it is important to note that only a small portion of the combination, that is cutting bit 13 need be constructed of expensive tool steel; the remainder, bit carrier 4, may be of a less expensive mild steel or the like thereby reducing the overall cost of the device of this invention.

Overlying the upper end of bit carrier 4 and secured to top 6 of shank 1 is a chip breaker 20 having a beveled edge 21 generally parallel to and spaced from the outer edge of cutting bit 13. Chip breaker 20 is formed with elongated slots 22, 23, the latter of which opens outwardly of one edge of said chip breaker. Screws 24, 25, inserted through slots 22, 23 respectively, and threaded into head portion 2 serve to secure chip breaker 20 in its operative position shown in Fig. 1.

It is seen that chip breaker 20, in addition to performing its usual function of breaking the chips cut from the work by cutting bit 13, also acts as a security clamp to hold bit carrier 4 in its adjusted, operative position. When it is desired to remove bit carrier 4 for sharpening bit 13, as previously described, chip breaker 20 may be swung to the position shown in Fig. 2 by loosening screws 24, 25 and rotating said chip breaker. The elongation of slots 22, 23 enables said chip breaker to be adjusted to varying degrees of spacing from the outer edge of bit 13 depending on cutting conditions encountered.

It is noted that the head of locking screw 15 is recessed into wedge 5 to present a flat upper surface across which chip breaker 20 may be swung. As an alternative to prying wedge 5 out of recess 3 upon sharpening or changing bit 13, the head of screw 15 may be further recessed into wedge 5 (Fig. 6) and a snap ring 27 placed in said recess above said screw. Screw 15 and wedge 5 perform the same function of locking bit carrier 4 in place in recess 3, but upon reverse threading of screw 15 the head thereof contacts snap ring 27 forcing wedge 5 outwardly of recess 3. In this manner unlocking of bit carrier 4 is simplified.

In the modification of the invention shown in Figs. 7 through 11, an elongated shank 31 is provided with an enlarged head 32 having a channel 33 formed transversely thereof. Said shank and head may be formed of mild steel or the like and said channel lined with a harder, longer wearing steel liner 34, secured in said channel. Channel 33 and liner 34 are shown in Fig. 7 oriented at approximately 45 degrees to the longitudinal axis of shank 31 for providing a versatile cutting angle for the tool.

Slidably mounted in channel 33 or liner 34 is an elongated bit carrier 35 having an integral cutting bit 36, of tool steel or the like, at one end thereof extending outwardly of one end of channel 33. The forward end or nose of said cutting bit may be formed to any contour desired and is shown in Fig. 7 as having substantially normal cutting edges, one of which is generally parallel to the longitudinal axis of shank 31 and the other transverse thereto. It is obvious that the angle between cutting edges of said bit may be varied depending upon requirements of the cutting job.

Overlying cutting bit 36 is chip breaker 37 having forward, beveled edges 38, generally parallel to and spaced back from the cutting edges of bit 36.

Securing bit carrier 35, bit 36 and chip breaker 38 in liner 34 is an elongated clamping member 39. Said member is arched so as to have a forward portion 40 bearing on the forward end of chip breaker 37 and bit 36, and a rear portion 41 extending into recess 33 and liner 34 at the rear of bit carrier 35. Centrally of said clamping member the same is secured to head 32 of shank 31 by a locking screw 42 extending through a hole 44 in said clamping member (Fig. 10), a hole 45 in chip breaker 37, a slot 43 in bit carrier 35 (Figs. 7, 10), and threaded into head 32.

A pressure adjusting screw 46 (Fig. 7, 11) is threaded through rear portion 41 of clamping member 39 and bears on line 34 for the purpose of elevating said rear portion to any desired degree. This feature assures that forward portion 40 of said clamping member forcefully bears on chip breaker 37 and cutting bit 36 upon threading screw 42 into head 32 of shank 31.

On each side of pressure adjusting screw 46 and threaded through rear portion 41 to bear on the rear end of bit carrier 35 are carrier advancing screws 48. Said screws are for the purpose of adjusting the amount of projection of cutting bit 36.

As in the previous case cutting bit 36, when worn, is sharpened by grinding the outer edges thereof. To remove the bit and carrier it is necessary only to loosen locking screw 42 and slide carrier 35 and bit 36 out of liner 34. After grinding, said bit and carrier may then be replaced in liner 34, advancing screws 48 turned to correctly adjust the projection of bit 36, and locking screw 42 tightened to clamp member 39 and bit 36 in place. Chip breaker 37 may be adjusted to different positions depending upon cutting conditions encountered by swinging said chip breaker about screw 42. Locking screw 42 obviously secures chip breaker 37 in its adjusted position when said locking screw is tightened into head 32 of shank 31.

When it is desired that the angle of the cutting bit be variable with respect to the longitudinal axis of the shank the modification shown in Figs. 12 through 16 may be provided. Such modification is similar to that illustrated in Figs. 7 through 11 except that channel 53 (Figs. 12, 15) is formed in a turret 54 rotatably mounted about a locking screw 62 to head 52 of shank 51. Similarly slidable in channel 53 is bit carrier 55 having tool steel bit 56 formed integral with the outer projecting end thereof. A chip breaker 57, having forward beveled edges 58, overlies bit 56, as previously described.

Clamping member 59, having forward portion 60 and rear portion 61, likewise clamps chip breaker 57, bit carrier 55, and cutting bit 56 in the operative position in channel 53 by means of locking screw 62 which is threaded into a hole 63 (Fig. 16) in head 52 of shank 51. Pressure adjusting screw 66 and bit advancing screws 68 (Fig. 12) are also provided in rear portion 61 of clamping member 59 for purposes previously described.

The operation of the tool of Figs. 12 through 16 and the procedure for removing and sharpening the bit thereof is substantially similar to that shown and described for the modification of Figs. 7 through 11. In the former, something more than the friction of locking screw 62 must be depended upon to prevent rotation of turret 54 during the cutting operation. As a consequence, head 52 is provided with two pair of threaded holes 64, 65 each diametrically opposed from hole 63 and each pair 90 degrees removed from the other. Turret 54 is provided with a pair of slots 69 through which turret locking bolts 67 are adapted to be inserted to be threaded into either holes 65 or holes 64.

In this manner the tool illustrated in Fig. 12 may be readily changed from a left hand tool to a right hand tool by removing bolts 67 from holes 65, rotating turret 54, and replacing bolts 67 in holes 64. The elongation of slots 69 in turret 54 allows the entering angle of the bit to be varied.

Although the invention has been described and illustrated in detail such is not to be taken as restrictive thereof as it is obvious that minor modifications could be made therein without departing from the spirit and scope of the invention.

I claim:

A metal cutting tool comprising an elongated shank having an enlarged head provided with a recess opening outwardly of the top and one side thereof, the sidewalls of said recess converging inwardly from said top and diverging inwardly from said one side, a removable bit carrier having a cutting bit integral with one corner thereof and having a portion opposed from said cutting bit formed complementary to one of said sidewalls and the back wall of said recess for reception in said recess adjacent said one sidewall and said back wall but spaced from the other of said sidewalls with said cutting bit extending outwardly of said head, a locking wedge formed complementary to said other sidewall, said back wall, and said portion of said carrier and converging downwardly from the top thereof for reception in said recess alongside said portion of said carrier, a locking screw bearing on said wedge and threaded into said head at the bottom of said recess for tightly wedging said portion of said carrier into said recess upon turning said locking screw in one direction, and an elevating screw, in threaded engagement with said carrier and bearing on the bottom of said recess.

References Cited in the file of this patent

UNITED STATES PATENTS

| | | |
|---|---|---|
| 73,431 | Beach | Jan. 21, 1868 |
| 150,276 | Beach | Apr. 28, 1874 |
| 256,668 | Gardner | Apr. 18, 1882 |
| 1,308,313 | Whitney | July 1, 1919 |
| 1,538,929 | De Vlieg | May 26, 1925 |
| 1,549,634 | Vokal | Aug. 11, 1925 |
| 1,991,494 | Dempsey | Feb. 19, 1935 |
| 2,166,826 | Shepherd | July 18, 1939 |
| 2,181,023 | Moore | Nov. 21, 1939 |
| 2,257,169 | Hopps | Sept. 30, 1941 |
| 2,584,505 | Severson | Feb. 5, 1952 |
| 2,644,224 | Chilcott | July 7, 1953 |
| 2,683,302 | Bader | July 13, 1954 |
| 2,693,019 | Greenleaf | Nov. 2, 1954 |
| 2,716,800 | Bader | Sept. 6, 1955 |